United States Patent [19]

DeBenedictis et al.

[11] 4,213,157
[45] Jul. 15, 1980

[54] SELF TRACKING LASER SCANNING APPARATUS

[75] Inventors: Leonard C. DeBenedictis, Los Angeles; Gary K. Starkweather, Saratoga, both of Calif.

[73] Assignee: Xerox Corporation, Stamford, Conn.

[21] Appl. No.: 9,628

[22] Filed: Feb. 5, 1979

[51] Int. Cl.² ............................................. H04N 1/04
[52] U.S. Cl. .................................... 358/293; 358/285; 358/302; 350/6.8
[58] Field of Search ................ 358/285, 293, 302; 350/6.8, 285

[56] References Cited

U.S. PATENT DOCUMENTS

| B 309,860 | 1/1975 | Starkweather . | |
| 2,059,221 | 11/1936 | Fessenden | 358/206 |
| 2,687,062 | 8/1954 | Baird | 354/121 |
| 2,961,918 | 11/1960 | Nadig | 350/6.8 |
| 3,029,685 | 4/1962 | Korneff | 350/285 |
| 3,597,536 | 8/1971 | Fowler | 350/6.91 |
| 3,646,568 | 2/1972 | Woywood | 350/6.8 |
| 3,663,083 | 5/1972 | Freedman | 350/201 |
| 3,813,140 | 5/1974 | Knockeart | 350/6.8 |
| 3,829,192 | 8/1974 | Wheeler | 350/6.8 |
| 3,867,571 | 2/1975 | Starkweather | 350/285 |
| 3,910,675 | 10/1975 | McGovern | 350/6.7 |
| 3,973,826 | 8/1976 | Lobb | 350/6.8 |
| 4,170,028 | 10/1979 | DeBenedictis | 358/285 |

OTHER PUBLICATIONS

*IBM Technical Disclosure Bulletin,* vol. 8, No. 6, Nov. 1965, p. 885.
*Journal of the SMPTE,* vol. 82, pp. 470–474, Jun. 1973.

Primary Examiner—Howard W. Britton
Attorney, Agent, or Firm—Irving Keschner

[57] ABSTRACT

Method and apparatus for improving the efficiency of laser scanning systems using a multifaceted rotating polygon or pyramid as the scanner. In particular, a beam of light, such as that generated by a laser beam, is directed onto a first facet of the scanner. This beam is expanded and reflected back to the same facet or any other facet on the scanner by optical means positioned adjacent the scanner so that the beam is caused to follow the facet of the scanner upon which the beam is reflected during a complete scan and to shift to the next facet for the following scan.

12 Claims, 4 Drawing Figures

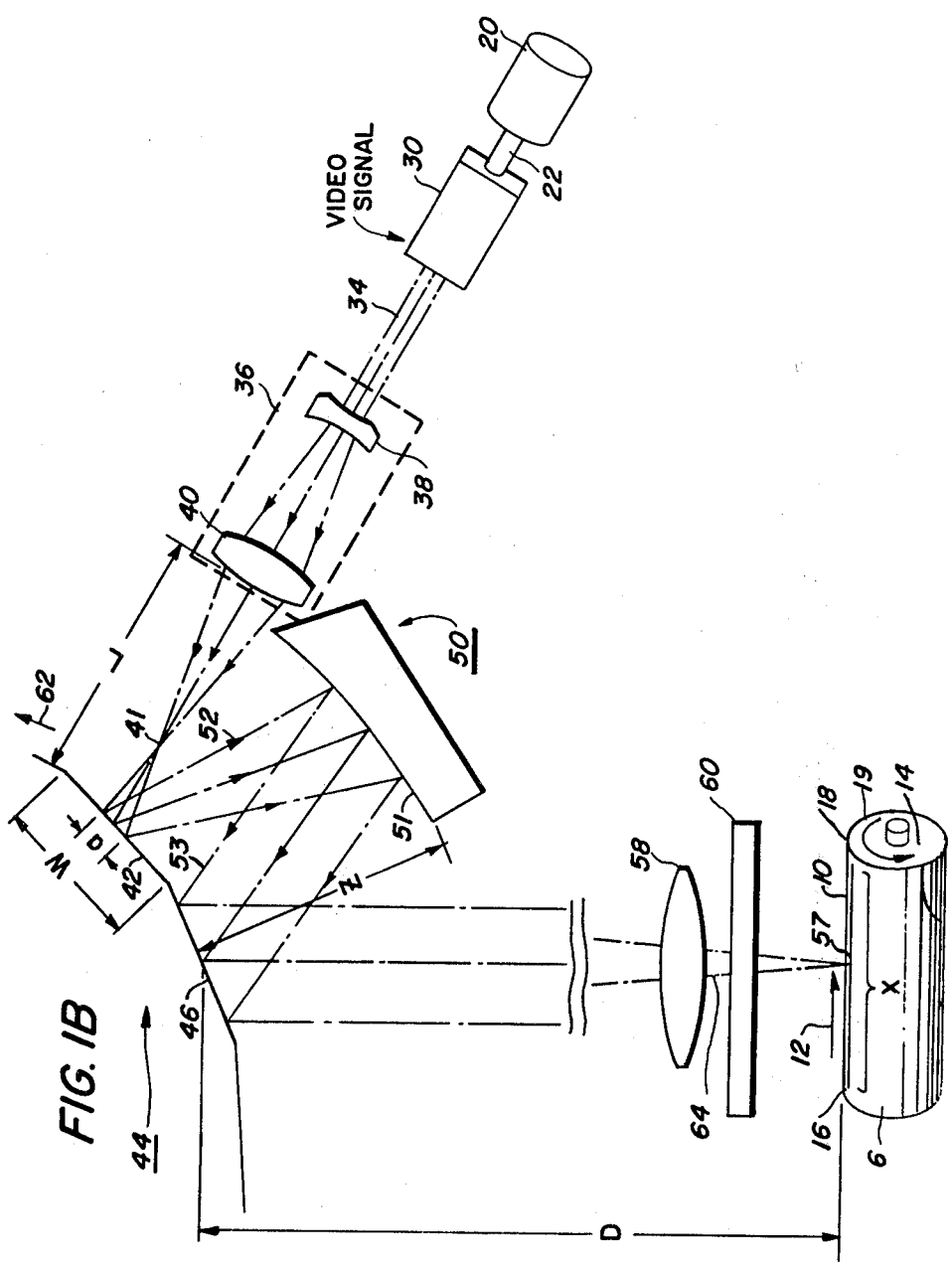

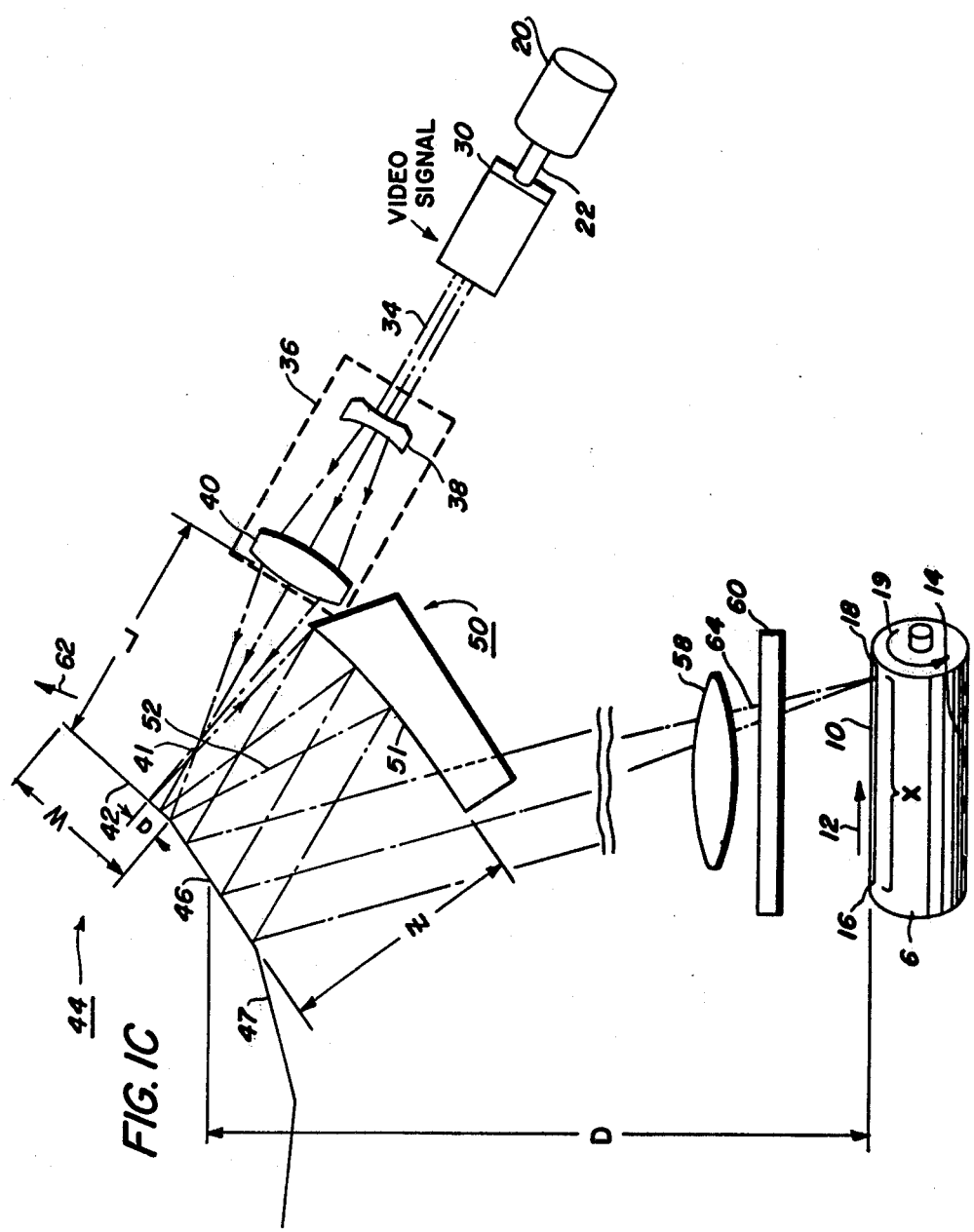
FIG. IC

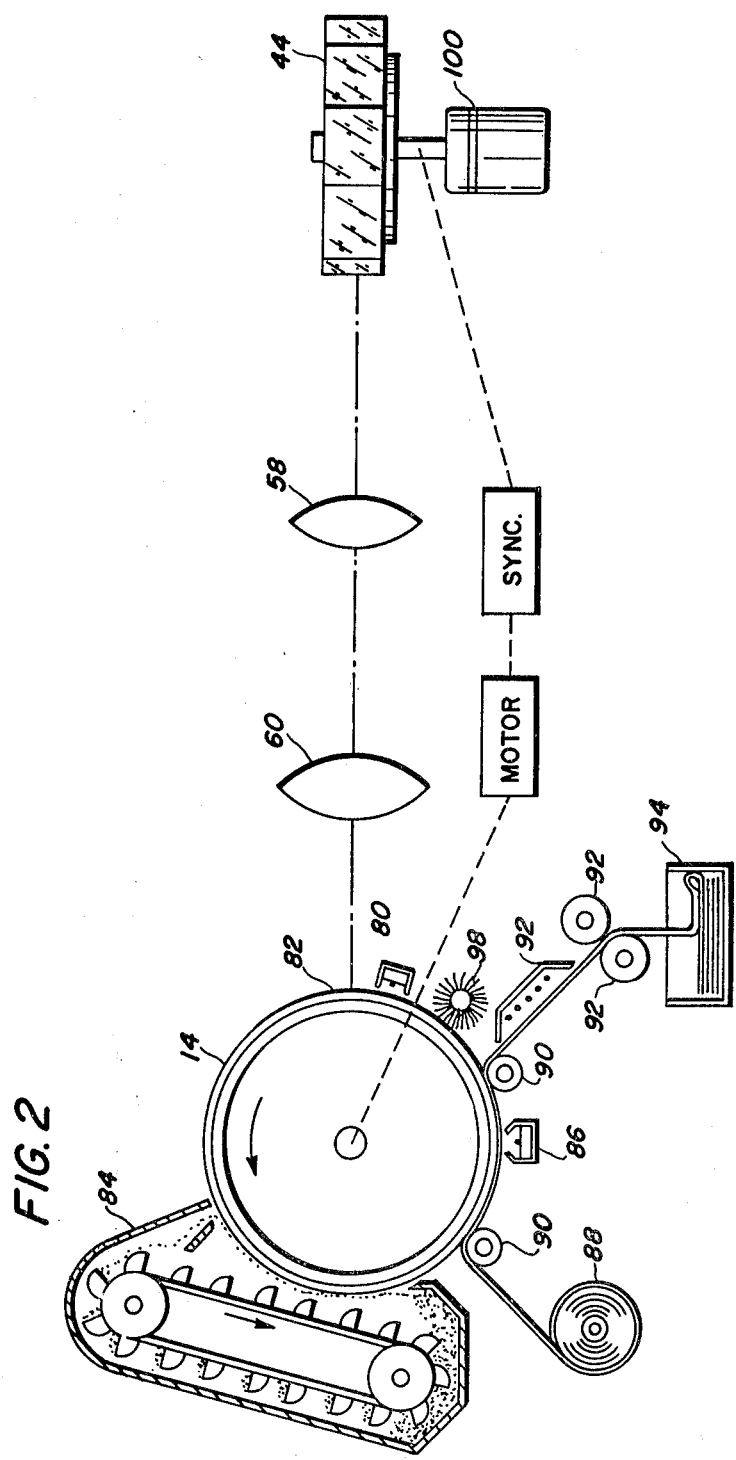

SELF TRACKING LASER SCANNING APPARATUS

BACKGROUND OF THE INVENTION

The use of laser scanning techniques for printing information on laser sensitive mediums have been disclosed in the prior art. For example, U.S. Pat. No. 3,922,485 discloses a multifaceted polygon optical scanner which scans a modulated laser beam across a xerographic medium. In order to print on the laser sensitive medium (i.e., the xerographic drum shown in the aforementioned patent), a laser of a particular output power is required. For example, the photoreceptor which comprises the xerographic medium disclosed in the aforementioned patent requires a laser flux of one milliwatt incident thereon to discharge predetermined charged areas of the photoreceptor to accomplish printing. In order to reduce the power requirements on the input laser which, in turn, would reduce its cost and size, the prior art has sought to optimize laser efficiency or in other words, the efficiency of the optical system such that maximum laser beam power is provided on the photoreceptor for a given input laser rated at a certain output power. One approach has been the optimization of the key components which comprise the optical system such as the modulator, polygon scanner and other major optical elements. However, the optical system reaches a certain point where efficiency does not increase. It has been found that typically optical scanning systems efficiencies are on the order of ten percent so that a ten milliwatt laser is required to apply one milliwatt of power on the photoreceptor. The impact of this performance is to require system designers to stress the laser power capability which in turn can effect the projected reliability, life, manufacturing cost, developemnt cost, and field operational costs. The end result of this projection may be to lessen the competitiveness of laser scanning systems of the type described in the aforementioned patent for printing applications.

It should be noted that the inefficiency of some of the components in the system is due to the contamination of various optical surfaces as well as glass-air interface light power losses. The surface losses of each optical element in the system effects the transmission of each element and cumulatively effects the efficiency of the overall scanning system. Further, in scanning systems which require more than one facet to be illuminated in order to reduce retrace times and provided a desired duty cycle such as that disclosed in the aforementioned patent, reduced system efficiencies are the result since only one beam from one facet can be utilized at a time. Generally, in order to provide a relatively uniform amount of light across the scan line, the beam illuminating the scanner facets is expanded to fully illuminate the facets. The end result of the beam expansion is that the percentage of light which can get through the scanner, even if the surfaces thereof were perfect reflectors, is severely reduced. The lower efficiencies inherent in illuminating two or more facets could be minimized by using a scanner facet dimension large compared to the optical beam incident at the polygon in the scan direction. Although this may be viable in a low resolution system or for a low speed scanner which can tolerate a large polygon dimension, this approach cannot be tolerated for high resolution systems or for high speed scanners.

SUMMARY OF THE INVENTION

The present invention provides a method and apparatus for increasing the efficiency of laser scanning systems which utilize multifaceted polygons or pyramids as the scanner. In particular, a beam of light, which may be modulated, is directed onto a first facet of the scanner, the beam being expanded and reflected back to the same scanner facet or any other facet on the scanner by optical means, such as a mirror or other optic, positioned adjacent the scanner so that the beam is caused to follow, or track, the facet of the scanner upon which the beam is reflected during a complete scan and shift to the next facet for the following scan.

The potential efficiency of the polygon-curved optical element combination for a desired duty cycle could exceed 90% and thereby increase the overall system transmission to a significant degree, reflectance losses being the major factor in reducing system efficiency. For example, if only a 50% overall efficiency were obtained, the impact of a $2\frac{1}{2}$ times reduction in input laser power requirements is dramatic. For example, systems which are 10% efficient and require 1 milliwatt of power at the laser sensitive medium require a 10 milliwatt input laser. By increasing system efficiency to 50%, a 2 milliwatt input laser can be utilized, thereby increasing laser life, decreasing laser purchase or manufacturing cost and increasing reliability of performance which accompanies the use of lower powered lasers.

It is an object of the present invention to provide method and apparatus for increasing the efficiency of a laser scanning system.

It is a further object of the present invention to provide method and apparatus for increasing the efficiency of a laser scanning system whereby the printing power requirements on the input laser is substantially reduced.

It is still an object of the present invention to increase the laser light transmission efficiency of a laser scanning system for a predetermined system duty cycle which utilizes a rotating multi-faceted polygon or pyramid as the scanner.

It is yet another object of the present invention to provide method and apparatus for increasing the laser light transmission efficiency of a laser scanning system which utilizes a rotating multifaceted polygon as the scanner, a beam of light, which may be modulated, being directed onto a first facet of the scanner, the beam being expanded and reflected back to the same scanner facet or any other facet on the scanner by optical means positioned adjacent the scanner so that the beam is caused to follow the facet of the scanner upon which the beam is reflected during a complete scan and to shift the laser beam to the next facet for the following scan.

It is a further object of the present invention to provide method and apparatus for increasing the laser light transmission efficiency of a laser scanning system which utilizes a rotating multifaceted polygon or pyramid as the scanner, a curved optical element, such as a mirror or other optic, reflecting a modulated laser beam incident on the optical element back to the scanner such that the beam follows one facet during a complete scan and shifting the laser beam to the adjacent facet for the following scan.

It is still a further object of the present invention to provide a laser scanning system which is simultaneously optimized for resolution, speed and optical throughput.

DESCRIPTION OF THE DRAWINGS

For a better understanding of the invention, as well as other objects and features thereof, reference is made to the following description which is to be read in conjunction with the accompanying drawings wherein:

FIGS. 1A, 1B and 1C are partial schematic diagrams of a preferred embodiment of the optical scanning system of the present invention at the start, mid and end scan positions, respectively and FIG. 2 shows a portion of the scanning system of the present invention being utilized to print information on a laser sensitive medium.

DESCRIPTION OF THE PREFERRED EMBODIMENT

Figure 1A:
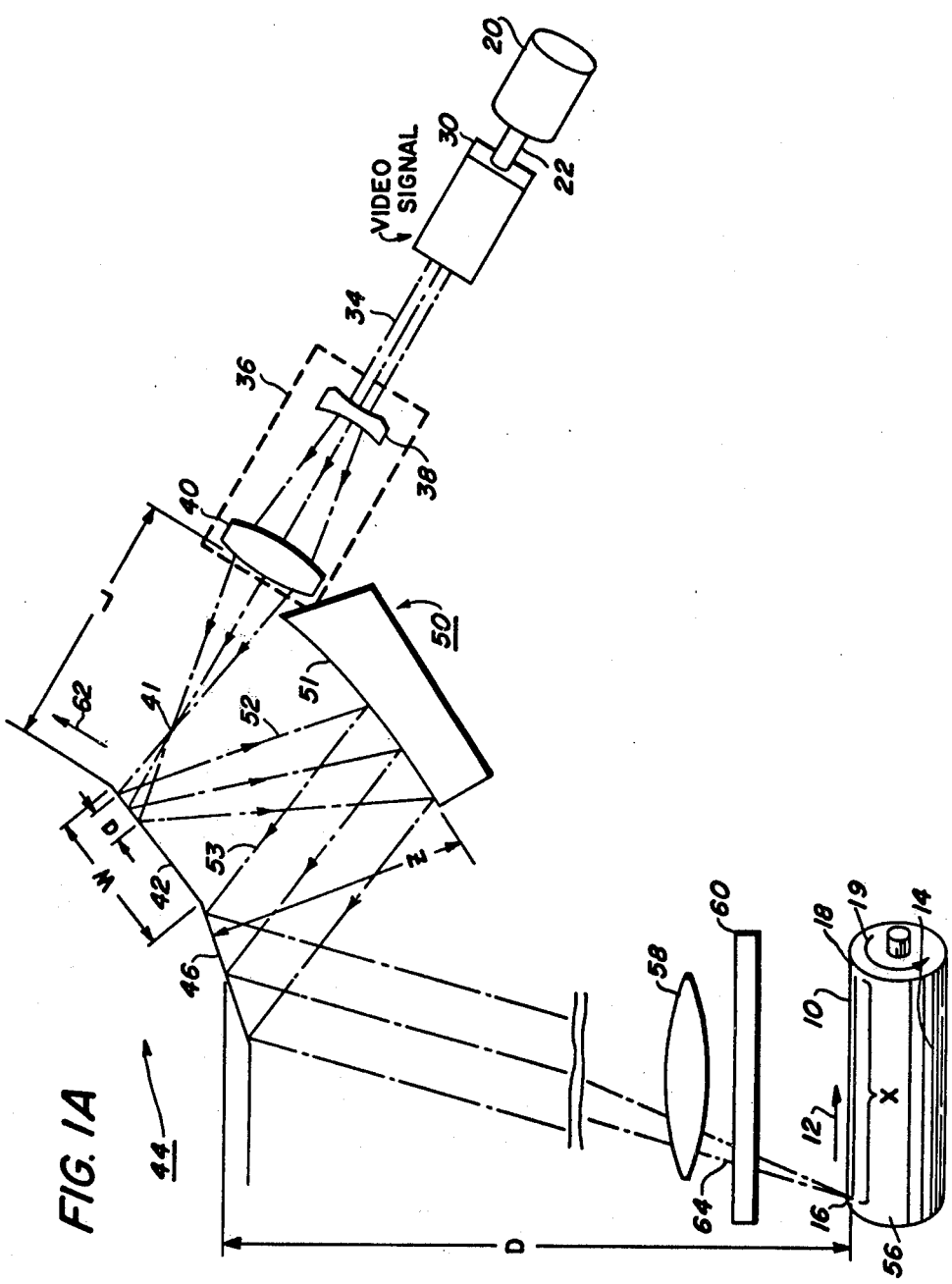

Referring now to FIG. 1A, a partial schematic diagram of the improved optical scanning system of the present invention at the start of scan position is illustrated. The schematic shows the scanning system at the beginning of a scan line 10, the scan line 10 being in the direction of arrow 12 along the surface of a medium 14 which is sensitive to the laser flux utilized in the system. It is assumed that the scan line 10 starts at point 16 on the surface of medium 14, the scan line 10 being along a width x, i.e. from point 16 to point 18. As shown, medium 14 is preferably a xerographic drum which is rotated in the direction of arrow 19 to provide the Y direction of scan. A light source 20 provides the original light beam 22 for utilization by the scanning system. The light source 20 is preferably a helium-cadmium or helium-neon laser. it is to be understood that the aforementioned lasers are cited as examples and that any light source which generates a collimated beam of monochromatic light may be used. The laser which generates a collimated beam of monochromatic light may modulated by an active optical element, such as acousto-optic modulator 30, in conformance with the information contained in a video signal applied to the modulator controller as set forth in the aforementioned patent.

The output laser beam 34 from modulator 30 is incident on and goes through optical focusing system 36, which in the preferred embodiment, comprises biconcave, cylindrical lens 38 and focusing lens 40. Optical system 36, which in this embodiment acts as a cylindrical lens since it has power only in the horizontal (or tangential) plane and no power in the vertical (or sagittal plane), expands the laser beam incident thereon causing the beam to be focused at focal spot 41 adjacent facet 42 of rotating scanner 44 which in the embodiment to be described is a multifaceted polygon (a multifaceted pyramidal scanner may also be utilized), the diameter of the imaged beam a at facet 42 being selected to correspond to the duty cycle requirements of the overall system. For examaple, if the width W of each of the polygon facets are 10 millimeters, than a spot diameter a of 1 millimeter at facet 42 would yield a duty cycle of 90%. The beam reflected from facet 42 is incident on optical element 50 which redirectes the beam 52 from facet 42 to facet 46 which in this embodiment is the next facet adjacent to facet 42. It should be noted that the system could be arranged such that the facet onto which beam 52 is redirected could by the same facet 42 or any other facet on the polygon or pyramid, the facets utilized in this technique being on the primary scanner 44 itself. Optical element 50, which in the preferred embodiment is a curved reflective element, redirects the beam 52 as parallel beam 53 to facet 46 which in turn scans the beam along the scan line 10 of xerographic medium 14. In essence, element 50 acts as a relay optic, imaging spot 41 to spot 16 at xerographic medium 14. The radius of curvature of optical element 50, if the optical element 50 is the mirror shown, is selected such that the focus of the scanning beam (spot 16) and the focus of optical system 36 (spot 41) are properly conjugate to each other. Preferably, optical system 36 and optical element 50 are cylindrical for purposes of beam confinement, the polygon 44 comprising twenty-four facets in the preferred embodiment. A lens 58 is provided to focus the beam in the tangential plane as shown and correction cylinder lens 60 is provided to focus the laser beam in the sagittal direction (orthogonal to the direction of scan) at point 16 on medium 14 as shown.

The polygon rotation is counterclockwise in the direction of arrow 62 as shown although polygon 44 may rotate in the opposite direction if desired. As can be seen in FIG. 1A, the beam incident on facet 46 may be arranged to substantially fill the facet, at least as far as the width of the beam 53 is concerned.

FIG. 1B shows the system in the mid-scan position with beam 55 incident on the xerographic medium 14 as spot 57, approximately at the middle of scan width x. As polygon 44 rotates in the counterclockwise position, the beam 52 from facet 42 moves along the aperture (reflecting surface 51) of optical element 50. Optical element 50, by virtue of its distance from facet 42 and scanning facet 46, redirects the incoming beam 52 as beam 53 so as to follow, or track, facet 46.

FIG. 1C shows the scanning system with the scanning beam 53 ready to make the transition to the next facet 59, beam 55 being incident on xerographic medium 14 at the end of scan position 18. Incoming beam 52 is redirected by surface 51 of optical element 50 to facet 46 of polygon 44, facet 46 still being tracked by beam 53. As polygon 44 continues to rotate, the next scan line 10 will be initiated on xerographic medium 14 at position 16 (start of scan line), incoming beam 43 will be incident on facet 46, beam 53 will be redirected to facet 59 and the cycle described hereinabove will be repeated.

The ray path in FIG. 1C are shown for the full scan position on the other side of the scan center. By spatially positioning optical elements 36 and 50 relative to each other, the ray paths do not intersect the mirror or optical element 50 (intersecting ray paths may occur if the number of polygon facets is less than thirty).

Optical elements 36 and 50 can be reduced in optical power if the system is allowed to "overchase" facet 46 (reducing the optical power of the elements make their fabrication less complex although the beam will not track the facet as well). If the facet width is 10 mm, for example, and the filled area need only be 7 mm, there is 3 mm of extra width that can be used to reduce the system compaction requirements. Another significant advantage in the present system is that the positioning of the system elements can be arranged such that the gaussian laser beam that is an input to the system is directed to facet 42 such that facet (which is the system exit pupil) is illuminated with the gaussian distribution. This provides the spot (16 in FIG. 1A) at the focal plane at xerographic medium 10 such that the spot energy distribution is gaussian with no diffraction secondaries (no oscillating characteristic around image, image degradation therefor being substantially reduced).

The following illustrates how the various parameters utilized to implement the teachings of the present invention can be computed. In particular, the following equations will provide the parameters necessary to implement the present invention:

$$fA = \frac{\phi}{2C \tan \psi} \quad (1)$$

$$fB = \frac{PQ'}{P + Q'} \quad \text{where } P = D + \frac{W}{2 \tan \psi} \quad (2)$$

$$Q' = \frac{f_a W}{\phi}$$

$$L = \frac{\phi}{2C \tan \psi}\left[1 + \frac{W(1 - C')}{\phi}\right] \quad (3)$$

$$Z = \frac{W}{2 \tan \psi} \quad (4)$$

where
C' = duty cycle desired
$\phi$ = input laser beam diameter at the first facet (facet 42)
W = facet width
$\psi$ = ½ scan angle
D = is the facet to photoreceptor surface distance
fA = focal length of optical element 36
fB = focal length of optical element 50
L = spacing of the front of element 40 from the surface of the facet in line with the optical axis of optical element 36
Z = spacing of optical element 50 from polygon 44

As an example, and utilizing an RCA model LD 2186 A helium-cadmium laser (1/$e^2$ beam diameter = 0.8 mm) the following results were obtained:
Let $\psi$ = 15° (24 facet system)
W = 1.0 centimeter
C' = 0.86
D = 40.6 centimeters, $\phi$ = 0.8 mm Using the above equations, the following results were obtained:
$f_A$ = 1.74 mm
P = 1049.9 mm
Q' = 21.70 mm
$f_B$ = 21.26 mm
L = 4.77 mm
Z = 18.67 mm As a further example, if optical element 36 is a reflective optic as shown, then
$r_a = 2f_A$,
$r_a = 3.48$ mm where $r_a$ is the radius of element 40.

If optical element 50 is also a reflective element as shown then $r_b = 2f_B = 42.52$ mm.

It should be noted that the above equations are utilized for the situation when the reflecting or scanning facet 46 is substantially filled (entire width of facet) with the laser light beam. If it is desired to further underfill or overfill a facet (substantially less than or greater than the entire width of the facet) a new value of $f_A$ is required.

The rotational axis of polygon 44 is orthogonal or nearly orthogonal to the plane in which the light beams travel. The facets of polygon 44 are mirrored surfaces for the reflection of any illuminating light impinging upon them. With the rotation of polygon 44 in the counterclockwise direction shown by arrow 62, light beam 55 is reflected from illuminated facet 46 and is translated through a scan angle for flying spot scanning. As set forth hereinabove, facet 46 (and each scanning facet thereafter) is completely tracked during the scan of each scan line 10.

The beam portion 55 reflected from facet 46 passes through a focusing lens 58 and cylindrical lens 60, cylindrical lens 60 having power only in the sagittal direction (orthogonal to the direction of scan), beam 55 being focused on the surface of medium 14 as shown.

The electrical video signal is applied to the input of modulator 30 as shown.

As set forth hereinabove and shown in FIG. 2, medium 14 may be a xerographic drum which rotates consecutively through a charging station depicted by corona discharge device 80, exposure surface 82 where the beam from the rotating polygon 44 traverses the scan width x on the drum 14, through developing station 84 depicted by a cascade development enclosure, transfer station 86 where a web of copy paper is passed in contact with the drum 14 and receives an electrostatic discharge to induce a transfer of the developed image from the drum 14 to the copy paper. The copy paper is supplied from the supply reel 88, passes around guide rollers 90 and through drive rollers 92 into receiving bin 94. A fusing device 96 fixes the images to the copy paper as it passes to bin 94.

Usable images are provided in that the information content of the scanning spot is represented by the modulated or variant intensity of light respective to its position within the scan width x. As the spot traverses the charges surface 82 through a given scan angle, the spot dissipates the electrostatic charge in accordance with its light intensity. The electrostatic charge pattern thus produced is developed in the developing station 84 and then transferred to the final copy paper. The xerographic drum 14 is cleaned by some cleaning device such as a rotating brush 98 before being recharged by charging device 80. In this manner, the information content of the scanned spot is recorded on a more permanent and useful medium. Of course, alternative prior art techniques may be employed to cooperate with a scanned spot in order to utilize the information contained therein. For example, the image can be transferred to cut sheet paper instead of the roll paper shown in the Figure.

The polygon 44 is continuously driven by a motor 100 and synchronized in rotation to a synchronization signal representative of the scan rate used to obtain the original video signal. The rotation rate of the xerographic drum 14 determines the spacing of the scan lines. It also may be preferable to synchronize the drum 14 in some manner to the signal to maintain image linearity.

While the invention has been described with reference to its preferred embodiment, it will be understood by those skilled in the art that various changes may be made and equivalents may be substituted for elements thereof without departing from the true spirit and scope of the invention. Further, many modifications may be made to adapt particular situations or materials to the teaching of the invention without departing from its essential teachings.

What is claimed is:
1. An improved flying spot scanning system for scanning the surface of a medium comprising:
means for providing a beam of radiant energy;
scanning means having at least first and second reflective surfaces;
means for imaging said beam upon said first reflective surface of said scanning means, said scanning means being positioned in the optical path of said imaged beam; and an optical element positioned adjacent said scanner, the light reflected from said first reflective surface being incident on said optical element and directed back thereby to said second reflective surface, said scanner means scanning said imaged spot across said medium by rotating said second reflective surface a desired angle to impart the information content of said beam to said medium, said beam being caused to track said second reflective surface during the rotation thereof.

2. The system as defined in claim 1 wherein the scanning means comprises a single multifaceted polygon having reflective facets for reflecting the radiant energy incident thereon onto said medium and means for rotating said polygon such that the reflected light is scanned in successive traces across said medium.

3. The system as defined in claim 2 wherein said radiant energy means is a laser which emits a beam of collimated light.

4. The scanning system as defined in claim 1 wherein said optical element is a reflective optic which reflects said incident light back to said second reflective surface.

5. The scanning system as defined in claim 1 wherein said second reflective surface is adjacent said first reflective surface.

6. The scanning system as defined in claim 1 wherein said scanning means comprises a single multifaceted pyramid having reflective facets for reflecting the radiant energy incident thereon onto said medium and means for rotating said pyramid such that the reflected light is scanned in successive traces across said medium.

7. An improved flying spot scanning system for recording information from an electrical signal onto a scanned medium comprising:
   means for providing a beam of radiant energy;
   means for modulating said beam in accordance with the information content of said electrical signal;
   means for imaging said modulated beam on a first reflective surface of a scanning means; and
   scanning means having at least said first reflective surface positioned in the optical path of said modulated beam and a second reflective surface; and
   an optical element positioned adjacent said scanner, the light reflected from said first reflective surface being directed back to said second reflective surface by said scanning means and reflected from said second reflective surface to said scanned medium, said scanner means being rotated such that said second reflective surface rotates a desired angle in order to scan said imaged modulated beam across said medium to impart the information content thereof to said medium, the beam directed from said optical element being caused to track said second reflective surface during the scanning of a scan line on said medium.

8. The system as defined in claim 7 wherein the scanning means includes a single multifaceted polygon having reflective facets for reflecting the radiant energy incident to it onto said medium and means for rotating said polygon such that the reflected light is scanned in successive traces across said medium.

9. The system as defined in claim 8 wherein said radiant energy means is a laser which emits a beam of collimated light.

10. The scanning system as defined in claim 7 wherein said optical element comprises a reflective optic which reflects said incident light back to said second reflective surface.

11. The scanning system as defined in claim 7 wherein said second reflective surface is adjacent said first reflective surface.

12. The system as defined in claim 7 wherein the scanning means comprises a multifaceted pyramid having reflective facets for reflecting the radiant energy incident thereon onto said medium and means for rotating said pyramid such that the reflected light is scanned in successive traces across said medium.

* * * * *